United States Patent
Jung et al.

(10) Patent No.: US 8,772,969 B2
(45) Date of Patent: Jul. 8, 2014

(54) STATIC TRANSFER SWITCH DEVICE, POWER SUPPLY APPARATUS USING THE SWITCH DEVICE AND SWITCHING METHOD THEREOF

(75) Inventors: Hyun-Chul Jung, Seoul (KR); Jung-Bong Kim, Yongin-si (KR)

(73) Assignee: KT Corporation, Gyeonggi-do (KR)

( * ) Notice: Subject to any disclaimer, the term of this patent is extended or adjusted under 35 U.S.C. 154(b) by 958 days.

(21) Appl. No.: 12/740,895

(22) PCT Filed: Oct. 31, 2008

(86) PCT No.: PCT/KR2008/006453
§ 371 (c)(1),
(2), (4) Date: Apr. 30, 2010

(87) PCT Pub. No.: WO2009/057979
PCT Pub. Date: May 7, 2009

(65) Prior Publication Data
US 2010/0264743 A1    Oct. 21, 2010

(30) Foreign Application Priority Data

Oct. 31, 2007 (KR) .......................... 10-2007-0110650
Oct. 16, 2008 (KR) .......................... 10-2008-0101667

(51) Int. Cl.
*H01H 1/00* (2006.01)

(52) U.S. Cl.
USPC .............................................. 307/86

(58) Field of Classification Search
CPC ........... H01G 9/00; H02B 11/00; H01H 1/00; H01L 29/00
USPC ............................................. 307/86
See application file for complete search history.

(56) References Cited

U.S. PATENT DOCUMENTS 3,662,182 A    5/1972    Ullmann et al.
4,811,163 A    3/1989    Fletcher
(Continued)

FOREIGN PATENT DOCUMENTS

EP    1 220 417 A2    7/2002
JP    04-165930 A    6/1992
(Continued)

OTHER PUBLICATIONS

Koyama Kenichi et al., "Development of Fast Opening Switch and Application as Thyristor Circuit Breaker thereof, New Switching Device for High Voltage Distribution Shortening Response Time of Opening and Closing Operation", Electricity Review, Nov. 1997, pp. 77-81.

(Continued)

*Primary Examiner* — Rexford Barnie
*Assistant Examiner* — Joseph Inge
(74) *Attorney, Agent, or Firm* — IP Legal Services, LLC

(57) ABSTRACT

Disclosed is a static transfer switch with a modified structure that can selectively supply power from power sources to a load stably and continuously, a power supplying apparatus employing the same, and a switching method thereof. The present invention includes mechanical/electrical contact point switches in parallel to semiconductor switches, and minimizes operation time of the semiconductor switches by turning on/off the mechanical or electrical contact point switches together when the semiconductor switches are turned on/off to reduce a failure rate of the semiconductor switch. Also, the static transfer switch makes a switching unit electrically/mechanically separable from a power source with failure to switch a power supply path and thereby prevent superposition caused by the switching unit. This prevents a problem caused when electrical or mechanical contact point switches simply in parallel, that is, a problem that power sources are turned on simultaneously when the power supply paths are switched.

21 Claims, 7 Drawing Sheets

(56) References Cited

U.S. PATENT DOCUMENTS

| | | | |
|---|---|---|---|
| 6,051,893 A | 4/2000 | Yamamoto et al. | |
| 6,377,428 B1* | 4/2002 | Ogasawara | 361/86 |
| 6,987,333 B2* | 1/2006 | Winick et al. | 307/85 |
| 7,265,458 B2* | 9/2007 | Edelen et al. | 307/65 |
| 7,348,766 B2* | 3/2008 | Hachiya et al. | 323/284 |
| 2002/0074863 A1 | 6/2002 | Turvey | |
| 2004/0183592 A1* | 9/2004 | Dettmann | 330/86 |
| 2006/0138862 A1* | 6/2006 | Wakisaka et al. | 307/3 |

FOREIGN PATENT DOCUMENTS

| | | |
|---|---|---|
| JP | 04-229033 A | 8/1992 |
| JP | 06-276686 A | 9/1994 |
| JP | 08-289485 A | 11/1996 |
| JP | 10-304598 A | 11/1998 |
| JP | 2000-014008 | 1/2000 |
| JP | 2003-235160 A | 8/2003 |
| JP | 2004-080977 A | 3/2004 |
| KR | 2019910002298 | 4/1991 |
| KR | 101998074826 | 11/1998 |
| KR | 1020050088107 A | 9/2005 |
| KR | 10-2006-0102267 A | 9/2006 |
| KR | 10-2006-0125282 A | 12/2006 |
| KR | 1020080101973 | 11/2008 |

OTHER PUBLICATIONS

European Patent Office, European Search Report for EP Application No. 08 845 447.5, Aug. 3, 2012.

Notice of Preliminary Rejection issued from Japan Patent Office on Jul. 12, 2011.

Notice of Preliminary Rejection issued from Korean Intellectual Property Office on Sep. 28, 2010.

Hyun-Chul Jung et al., "ISC-STS Proposal for Reliability improvement of Communication System's Power Supply", Journal of Conference on Power Electronics, Oct. 2008, pp. 383-390.

* cited by examiner

Waveform in STS operation test

Waveform in STS operation test

US 8,772,969 B2

STATIC TRANSFER SWITCH DEVICE, POWER SUPPLY APPARATUS USING THE SWITCH DEVICE AND SWITCHING METHOD THEREOF

This application is a national stage application of PCT/KR2008/006453 filed on Oct. 31, 2008, which claims priority of Korean patent application number 10-2007-0110650 filed on Oct. 31, 2007 and 10-2008-0101667 filed on Oct. 16, 2008. The disclosure of each of the foregoing applications is incorporated herein by reference in its entirety.

TECHNICAL FIELD

The present invention relates to a static transfer switch (STS) for supplying static power source, a power supplying apparatus using the static transfer switch, and a switching method thereof. More particularly, the present invention relates to a static transfer switch that is provided at output ends of a plurality of power sources operating in parallel and when any one power source malfunctions, a power supplying path is switched from the malfunctioning power source to another power source to selectively supply power to a load so that power is supplied stably and continuously, a power supplying apparatus, and a switching method thereof.

BACKGROUND ART

Rapid progress in electrical, electronic, information communication technologies combines information communication systems, such as computers, switches, transmission equipment, repeaters, and servers, closely and organically. These information communication systems cannot secure reliability without very stable power supply. In other words, equipment requiring high-level digital information processing, such as cutting-edge industrial equipment, medical equipment, computers, diverse financial equipment, office automation equipment, precise control equipment, and information communication equipment, is very sensitive to a voltage variation such as sagging, swelling, outage, overvoltage, low voltage, and voltage unbalance.

Undesired voltage variation may degrade the quality of electrical power, electronic equipment may malfunction, stop operation, or even cause fire. To cope with power failure or a change in voltage, devices capable of preventing abnormality in power source such as voltage variation, frequency variation, temporary electricity failure, and overvoltage and continuously supplying stable power source. A representative one of such devices is a uninterruptible power supplier (UPS).

Also, more than two UPSs are set up for a load that may cause a great deal of economic damage when temporary load accident occurs, and a static transfer switch is set up in the output end of each UPS to prepare for a case where any one UPS goes out of order.

FIG. 1 is a schematic diagram showing a structure of a typical power supplying apparatus supplying power to a load by using two UPSs. FIG. 2 is a schematic diagram describing a structure of a typical power supplying apparatus supplying power to a load by using two UPSs with a static transfer switch.

The static transfer switch is set up between the output ends of first and second UPSs (Source1 and Source2) of the power supplying apparatus shown in FIG. 1. The static transfer switch supplies output power source of any one between the first and second UPSs (Source1 and Source2) to a load so as to supply power source stably.

For this, the output ends of the UPSs (Source1 and Source2) are connected to the input ends of silicon controlled rectifier (SCR) switches (SCR1 and SCR2) through the static transfer switch, and the output ends of the SCR switches (SCR1 and SCR2) are commonly connected to the load. The silicon controlled rectifier is also called thyristor. First and second SCR switches (SCR1 and SCR2) are connected to first and second circuit brakes (CB1 and CB2) in parallel, respectively. The first and second circuit brakes (CB1 and CB2) cut off a circuit manually.

The first and second circuit brakes (CB1 and CB2) are manipulated by a human being to check a system when an SCR switch is broken down and examined or in case of emergency.

DISCLOSURE

Technical Problem

The static transfer switch shown in FIG. 1 supplies power source from any one power source between the UPSs (Source1 and Source2) to a load through any one between the SCR switches (SCR1 and SCR2). Herein, a pair of silicon controlled rectifiers (SCR), which are core elements of an SCR switch are repeatedly turned on/off. A static transfer switch generally has a lifespan of about 8 to 10 years due to fatigue originated from the continuous operation of repeating turn-on/off. When any one of the silicon controlled rectifiers of the SCR switches (SCR1 and SCR2) is lost, the static transfer switch cannot normally supply power to a load regardless of the power supply from a UPS. SCR switches have a failure rate of about 2% per year when they perform a normal operation and this leads to such a problem as instable power supply.

For example, when the output power source of the first USP (Source1) is in a normal state and a short occurs due to a failure of the first SCR switch, power supply to a load falls in trouble first. Secondly, a control unit (now shown) of the static transfer switch decides than there is no output from the first SCR switch (SCR1) and turns on the second SCR switch (SCR2) to thereby the output from the second UPS (Source2) is shorted, which may lead to a massive accident.

Moreover, harmonics generated during the turn-on/off operation generates reverse current, although the intensity of the generated harmonics is low in the SCR switch, which is a core element of a static transfer switch. The reverse current also generates harmonics, stress, noise or electromagnetic wave in the constituent elements of a UPS positioned at the fore part of the static transfer switch, such as an inverter shown in FIG. 4, a rectifier shown in FIG. 4, and a control unit. For this reason, a power supply system having a static transfer switch at the output end of a UPS suffers higher element failure rate than a power supply system including only UPS.

As described above, the conventional technology has a problem caused by a failure of an SCR switch and an instable power supply problem. Also, it has a problem of increased failure rate of some UPS constituent elements due to reverse current. The present invention is devised to overcome the problems of the conventional technology.

To solve the problems, the present invention modifies the structure of a static transfer switch selectively supplying power from a plurality of power sources to a load in order to supply power to the load stably and safely.

The present invention includes mechanical or electrical contact point switches (see FIG. 2) in parallel to semiconductor switches, e.g., SCR switches, and minimizes operation time (which means use time) of the semiconductor switches, for example 200 mS/year, by turning on/off the mechanical or electrical contact point switches together when the semiconductor switches are turned on/off to thereby reduce a failure rate of the semiconductor switch.

Also, since the mechanical or electrical contact point switches are turned on/off together with the semiconductor switches, load current during operation is supplied through the mechanical or electrical contact point switches. Thus, the problem associated with harmonics generated in an SCR switch of a static transfer switch can be eliminated fundamentally.

In addition, the present invention prevents power supply from being superposed when power supply path is switched by a switch. Therefore, even if the static transfer switch is broken down, it can prevent the failure of the static transfer switch from affecting a load and an input UPS.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a static transfer switch, including: a first contact switching means which is turned on or off according to a first driving signal to supply output power of a first power source to a load; a first semiconductor switching means connected in parallel to the first contact switching means and turned on or off according to a first gate signal to supply the output power of the first power source to the load when the first contact switching means is turned off; a second contact switching means which is turned on or off according to a second driving signal to supply output power of a second power source to the load; a second semiconductor switching means connected in parallel to the second contact switching means and turned on or off according to a second gate signal to supply the output power of the second power source to the load when the second contact switching means is turned off; and a control means for generating the first and second driving signals and the first and second gate signals, wherein the control means generates the first driving signal and the first gate signal together and generates the second driving signal and the second gate signal together.

In accordance with another aspect of the present invention, there is provided a static transfer switch, including: a switching means including a plurality of switching units each including a semiconductor switch which is turned on or off according to a gate signal and a contact point switch which is turned on or off according to a driving signal to selectively supply output power of a plurality of power sources to a load; a contact point sensing unit for sensing whether each contact point switch is electrically turned off and outputting a contact point sense signal; a state detecting unit for sensing whether each switch unit is turned off according to output power of each switching unit and the contact point sense signal transmitted from the contact point sensing unit and outputting a state signal; and a switching command unit for commanding to switch a power supply path to the load according to the state signal outputted from the state detecting unit.

In accordance with another aspect of the present invention, there is provided a power supplying apparatus, including: a first power source; a second power source; a first contact switching means which is turned on or off according to a first driving signal to supply output power of the first power source to a load; a first semiconductor switching means connected in parallel to the first contact switching means and turned on or off according to a first gate signal to supply the output power of the first power source to the load when the first contact switching means is turned off; a second contact switching means which is turned on or off according to a second driving signal to supply output power of the second power source to the load; a second semiconductor switching means connected in parallel to the second contact switching means and turned on or off according to a second gate signal to supply the output power of the second power source to the load when the second contact switching means is turned off; and a control means for generating the first and second driving signals and the first and second gate signals, wherein the control means generates the first driving signal and the first gate signal together and generates the second driving signal and the second gate signal together.

In accordance with another aspect of the present invention, there is provided a power supplying apparatus, including: a plurality of power sources; a switching means including a plurality of switching units each including a semiconductor switch which is turned on or off according to a gate signal and a contact point switch which is turned on or off according to a driving signal to selectively supply output power of the plurality of power sources to a load; a contact point sensing unit for sensing whether each contact point switch is electrically turned off and outputting a contact point sense signal; a state detecting unit for sensing whether each switch unit is turned off according to output power of each switching unit and the contact point sense signal transmitted from the contact point sensing unit and outputting a state signal; and a switching command unit for commanding to switch a power supply path to the load according to the state signal outputted from the state detecting unit.

In accordance with another aspect of the present invention, there is provided a switching method, including: outputting a first control signal for turning off a first switching means corresponding to a first power source to the first switching means, when a failure is sensed in output power of the first power source supplying power to a load; checking whether the first switching means is electrically completely turned off; and outputting a second control signal for turning off a second switching means corresponding to a second power source to the second switching means, when the first switching means is turned off.

Advantageous Effects

The present invention can supply power to a load stably and safely by modifying a structure of a static transfer switch selectively supplying power outputted from a plurality of power sources to a load.

To be specific, the present invention includes mechanical or electrical contact point switches in parallel to semiconductor switches, e.g., SCR switches, and minimizes operation time (which means use time) of the semiconductor switches, for example 200 mS/year, by turning on/off the mechanical or electrical contact point switches together when the semiconductor switches are turned on/off to thereby reduce a failure rate of the semiconductor switch.

Also, since the mechanical or electrical contact point switches are turned on/off together with the semiconductor switches, load current during operation is supplied through the mechanical or electrical contact point switches. Thus, the problem associated with harmonics generated in an SCR switch of a static transfer switch can be eliminated fundamentally.

In addition, the present invention prevents power supply from being superposed when power supply path is switched by a switch. Therefore, even if the static transfer switch is broken down, it can prevent the failure of the static transfer switch from affecting a load and an input UPS.

MAJOR CONSTITUENT ELEMENTS SHOWN IN DRAWINGS

Figure 1:
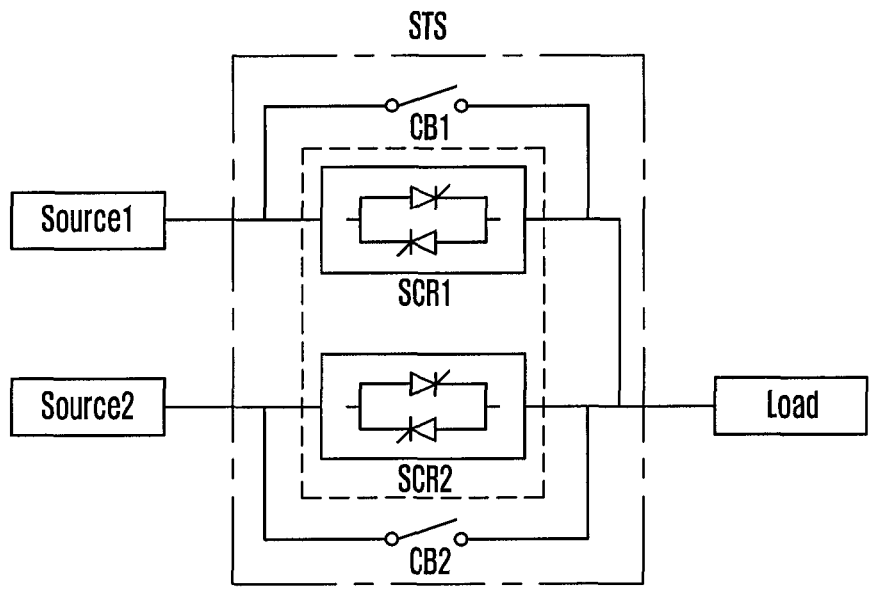
FIG. 1 is a schematic diagram showing a structure of a typical power supplying apparatus supplying power to a load by using two UPS.
Figure 2:
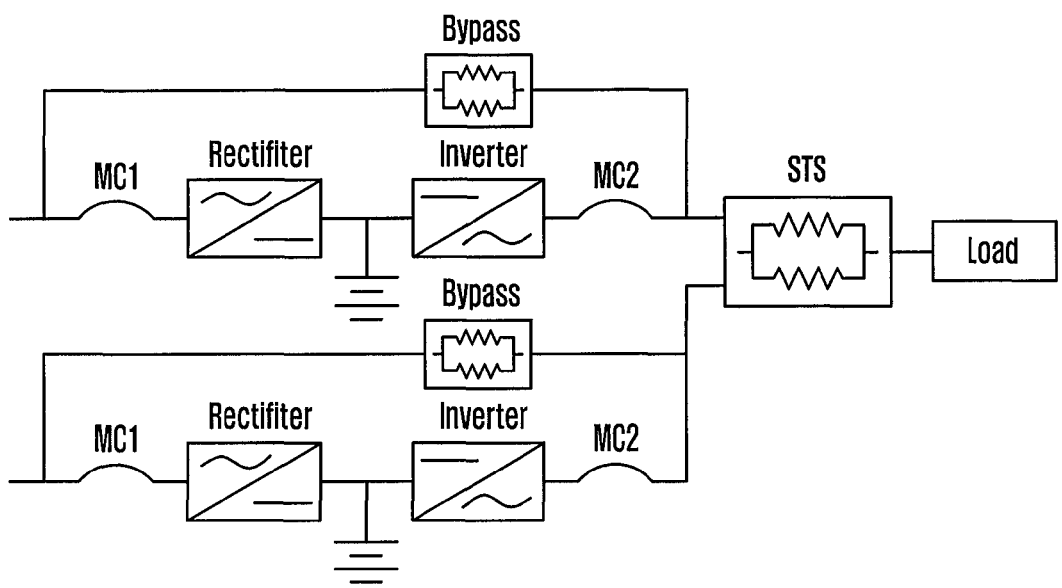
FIG. 2 is a schematic diagram describing a structure of a typical power supplying apparatus supplying power to a load by using two UPSs with a static transfer switch.

21: control unit
42: second switching unit
43: first contact point sensing unit
44: second contact point sensing unit
45: first power source sensing unit
46: second power source sensing unit
47: first state detecting unit
48: second state detecting unit
49: switching command unit
41: first switching unit

BEST MODE FOR THE INVENTION

The advantages, features and aspects of the invention will become apparent from the following description of the embodiments with reference to the accompanying drawings, which is set forth hereinafter. When it is considered that detailed description on a related art may obscure a point of the present invention, the description will not be provided herein. Hereafter, specific embodiments of the present invention will be described in detail with reference to the accompanying drawings.

Figure 3:
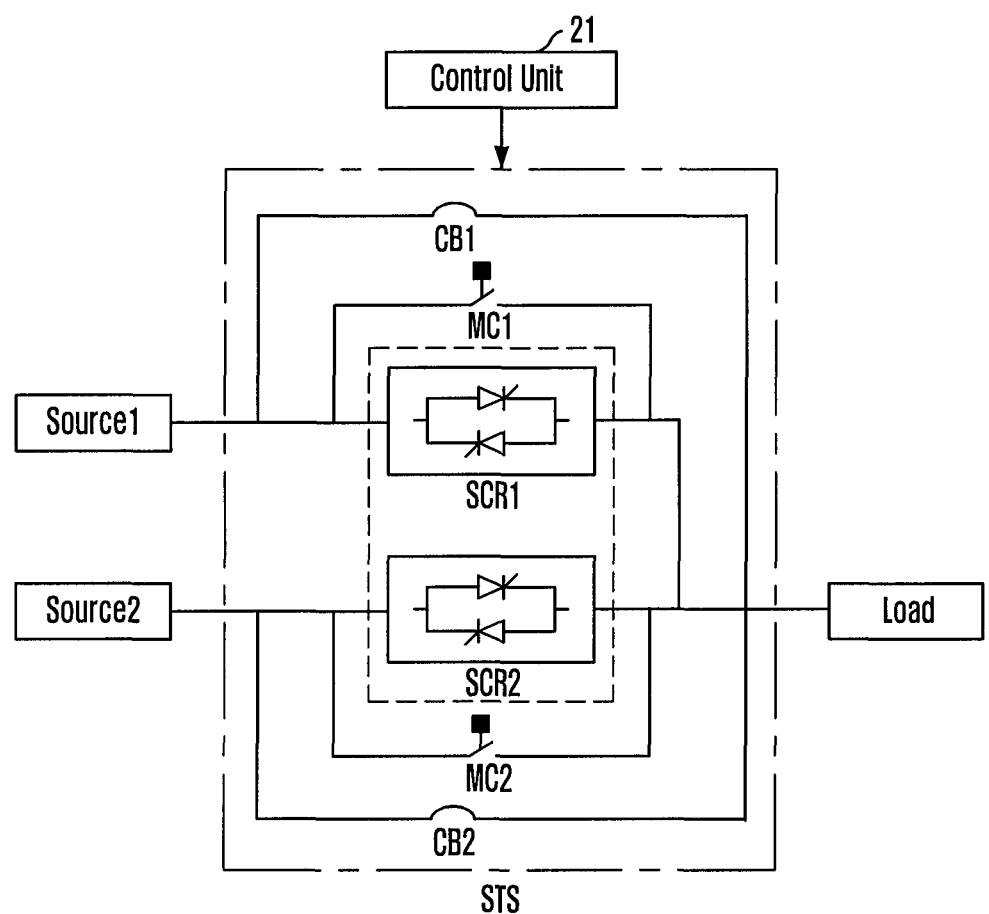
FIGS. 3 and 4 are schematic diagrams illustrating a static transfer switch for static power supply and a power supplying apparatus using the static transfer switch in accordance with a first embodiment of the present invention.
Figure 4:
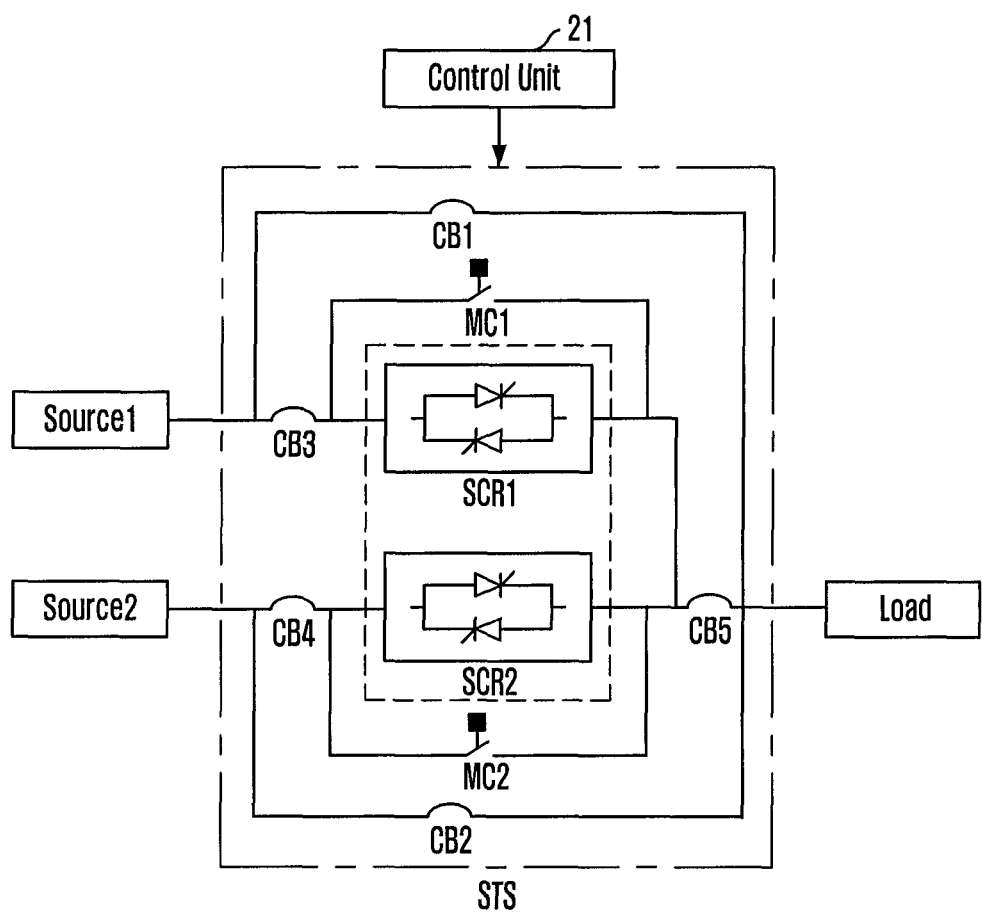

FIGS. 3 and 4 are schematic diagrams illustrating a static transfer switch for static power supply and a power supplying apparatus using the static transfer switch in accordance with a first embodiment of the present invention.

In FIGS. 3 and 4, the same reference numerals are given to the same constituent element shown in FIG. 1.

Referring to FIG. 3, the power supplying apparatus according to the first embodiment of the present invention includes first and second UPSs (Source1 and Source2), which are power sources, and a static transfer switch. The static transfer switch includes first and second SCR switches (SCR1 and SCR2), first and second magnetic (MC) switches or first and second motor driving (MCC) switches, and first and second manual circuit brakes (CB1 and CB2). Hereafter, the first and second magnetic (MC) switches or first and second motor driving (MCC) switches will be referred to as motor driving switches (MC1 and MC2).

In the first embodiment of the present invention, since the first and second UPSs (Source1 and Source2), which are used as an example of a power source, are widely known commercial products, description on them will not be provided herein. Meanwhile, it is possible to use a commercial power source from a power source network as a power source in the present invention.

The first SCR switch (SCR1) is turned on/off according to a first gate signal transmitted from a control unit 21. When the first gate signal is applied and the first motor driving switch (MC1) connected thereto in parallel is turned off, output power from the first UPS (Source1) is supplied to a load.

The second SCR switch (SCR2) is turned on/off according to a second gate signal transmitted from the control unit 21. When the second gate signal is applied and the second motor driving switch (MC2) connected thereto in parallel is turned off, output power from the second UPS (Source2) is supplied to the load.

One end of the first and second SCR switches (SCR1 and SCR2) is connected to an output end of the first and second UPSs (Source1 and Source2), and the other end is connected to the load in common.

The first motor driving switch (MC1) is a mechanical contact point switch with minimized impedance component. It is turned on/off by a driving motor (not shown) driven according to a first driving signal transmitted from the control unit 21 and it is connected in parallel to the first SCR switch (SCR1). Herein, the first driving signal is applied to the first motor driving switch (MC1) at the same time when the first gate signal is applied to the first SCR switch (SCR1) to thereby drive the driving motor and turn on the first motor driving switch (MC1). On the contrary, when the apply of the first gate signal to the first SCR switch (SCR1) is cut off, the driving motor of the first motor driving switch (MC1) is driven reversely to thereby turn off the first motor driving switch (MC1).

The second motor driving switch (MC2) is a mechanical contact point switch with minimized impedance component, just as the first motor driving switch (MC1). It is turned on/off by the driving motor (not shown) driven according to a second driving signal transmitted from the control unit 21 and it is connected in parallel to the second SCR switch (SCR2). Herein, the second driving signal is applied to the second motor driving switch (MC2) at the same time when the second gate signal is applied to the second SCR switch (SCR2) to thereby drive the driving motor and turn on the second motor driving switch (MC2). On the contrary, when the apply of the second gate signal to the second SCR switch (SCR2) is cut off, the driving motor of the second motor driving switch (MC2) is driven reversely to thereby turn off the second motor driving switch (MC2).

The generation of a driving signal can be controlled by the existing control unit which generates a gate signal or an additional control unit. All constituent elements performing such control function will be collectively referred to as a control unit 21 herein. Consequently, the control unit 21 generates the first driving signal and the first gate signal together, and the second driving signal and the second gate signal together.

The first and second manual circuit brakes (CB1 and CB2) are connected to the first and second SCR switches (SCR1 and SCR2) and the first and second motor driving switches (MC1 and MC2) in parallel, respectively. When a failure occurs in the first and second SCR switches (SCR1 and SCR2) and the first and second motor driving switches (MC1 and MC2) that are connected in parallel, the first and second manual circuit brakes (CB1 and CB2) are turned on to supply power from the first and second UPSs (Source1 and Source2) to the load.

Referring to FIG. 4, third to fifth manual circuit brakes (CB3, CB4 and CB5) may be further connected to the first and second SCR switches (SCR1 and SCR2) and the first and second motor driving switches (MC1 and MC2) in parallel.

The usage of the third to fifth manual circuit brakes (CB3, CB4 and CB5) will be described by taking an example. When the first SCR switch (SCR1) and the first motor driving switch (MC1) need to be separated from a power supply path such as a case where a failure occurs in the first SCR switch (SCR1) or the first motor driving switch (MC1) and needs to be fixed, or a case where some maintenance and repair is needed for the first SCR switch (SCR1) or the first motor driving switch (MC1), the third and fifth manual circuit brakes (CB3 and CB5) are turned off and the first SCR switch (SCR1) and the first motor driving switch (MC1) are separated from the power supply path.

Likewise, when the second SCR switch (SCR2) and the second motor driving switch (MC2) need to be separated from a power supply path such as a case where a failure occurs in the second SCR switch (SCR2) or the second motor driving switch (MC2) and needs to be fixed, or a case where some maintenance and repair is needed for the second SCR switch (SCR2) or the second motor driving switch (MC2), the fourth and fifth manual circuit brakes (CB4 and CB5) are turned off and the second SCR switch (SCR2) and the second motor driving switch (MC2) are separated from the power supply path.

Although the first embodiment of the present invention takes an example of SCR switches, other semiconductor switches such as Insulated Gate Bipolar Transistor (IGBT) switch, Gate Turn-Off (GTO) switch, and Bipor Junction Transistor (BJT) switch can be used.

Also, magnetic (MC) switches or motor driving (MCC) switches have been taken as an example in the first embodiment of the present invention, a mechanical or electrical contact point switch such as latch-type electronic contact (MMC) switch or general electronic contact switch may be used.

Hereafter, operation of a static transfer switch having the structure of FIG. 3 will be described.

When a failure occurs in the output power of the first UPS (Source1) and the power source is switched to the second UPS (Source2), the first gate signal applied to the first SCR switch (SCR1) is cut off and the second gate signal is applied to the second SCR switch (SCR2) to turn on the second SCR switch (SCR2). The second driving signal is generated upon the application of the second gate signal and the second motor driving switch (MC2) connected in parallel to the second SCR switch (SCR2) is turned on.

Herein, since the second motor driving switch (MC2) is a switch mechanically contacted by the operation of the motor, it takes more time to turn on the second motor driving switch (MC2) than to turn on the second SCR switch (SCR2) although the second driving signal and the second gate signals are applied at the same time.

Therefore, the output power of the second UPS (Source2) is supplied to the load through the second. SCR switch (SCR2) initially.

Subsequently, when the second motor driving switch (MC2) is turned on, the impedance (which is a contact resistance) of the second motor driving switch (MC2) is smaller than the semiconductor internal impedance of the second SCR switch (SCR2), the output power of the second UPS (Source2) is supplied to the load through the second motor driving switch (MC2).

Herein, since the second gate signal is continuously supplied to the second SCR switch (SCR2), the second SCR switch (SCR2) is not turned on/off because output power of the second UPS (Source2) is not supplied. However, since the second SCR switch (SCR2) continues to receive the second gate signal, it can operate instantly and supply power to the load when a failure occurs in the second motor driving switch (MC2) and power cannot be supplied through the second motor driving switch (MC2) and the output power of the second UPS (Source2) is supplied to an input end of the second SCR switch (SCR2) again.

When the power source is switched from the second UPS (Source2) to the first UPS (Source1), it operates based on the same principle.

As described in the above embodiment, although each SCR switch receives power through a power supply line connected thereto, the power is actually supplied not through the SCR switch itself but through a motor driving switch, the fatigue can be reduced remarkably. The decreased fatigue leads to drastic decrease in a failure rate. Moreover, although an SCR switch goes out of order, it does not affect the load.

Also, each SCR switch takes charge of actually supplying power until a corresponding motor driving switch (MC) is turned on. When the corresponding motor driving switch (MC) is turned on, although power is supplied through a power supply line connected to it, the actual power supply is not performed through itself but through the turned-on motor driving switch. Therefore, the turn-on/off frequency number of the SCR switch is decreased remarkably. Accordingly, little reverse current is generated from the timing difference between the turn-on and turn-off of the SCR switch. This naturally resolves the problem of failure occurring in the fore-part elements of the SCR switch, such as an inverter, a charger, a rectifier, and a controller.

Figure 5:
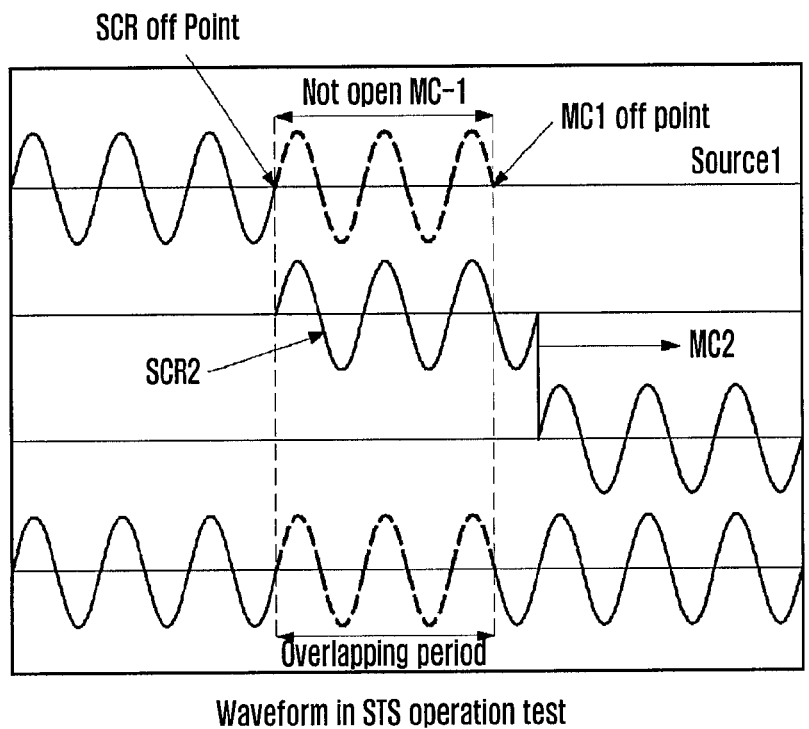
FIG. 5 shows waveforms during superposition when a power supply path is switched by simply connecting mechanical contact point (MC) switch to the static transfer switch in parallel as shown in FIGS. 3 and 4.
Figure 5:
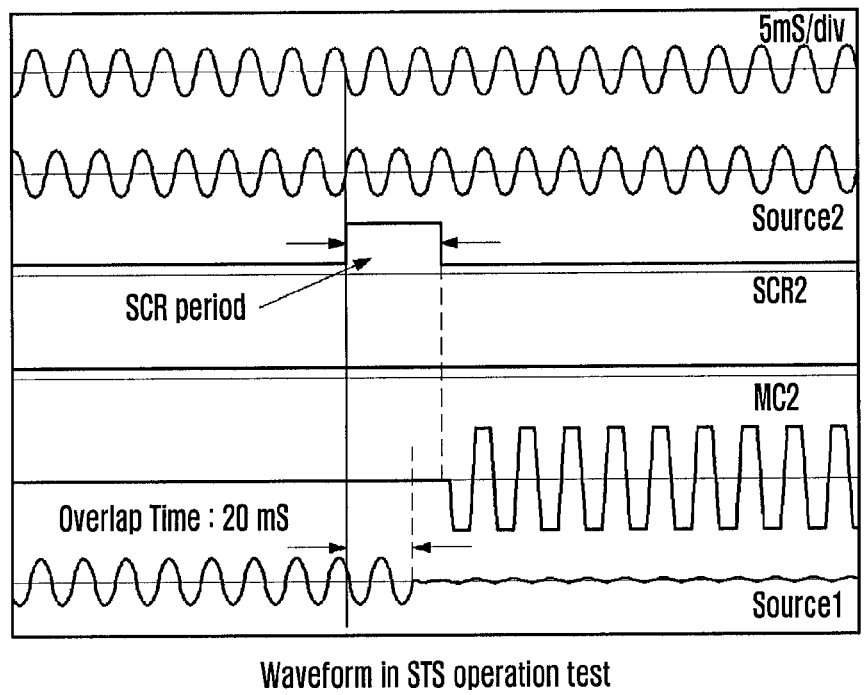

When the motor driving switches are set up in parallel to the SCR switches as shown in the first embodiment of the present invention described above, a difference between the reaction time (which ranges from approximately 3 μs to approximately 200 μs) of the SCR switches and the operation speed (which ranges from approximately 12 μs to approximately 609 μs) of the motor driving switches causes superposition of power sources for a predetermined time period during the switching of the power source, which is described in FIG. 5.

FIG. 5 shows waveforms during superposition when a power supply path is switched by simply connecting mechanical contact point (MC) switch to the static transfer switch in parallel as shown in FIGS. 3 and 4.

For example, when a power source is switched from the first UPS (Source1) to the second UPS (Source2), the second SCR switch (SCR2) is turned on while the first motor driving switch (MC1) is not electrically turned off. Thus, both of the first motor driving switch (MC1) and the second SCR switch (SCR2) on the different power supply paths are turned on to thereby cause superposition shown in FIG. 5.

The superposition phenomenon does not matter in a blackout mode where the power supply path for the first UPS (Source1) is normally blocked. However, when the power supply path is switched due to an error such as short, surge, electric leakage, or ground, a closed circuit is formed between the first UPS (Source1) and the second UPS (Source2) and this may cause an accident where both first and second UPSs (Source1 and Source2) are stopped.

Figure 6:
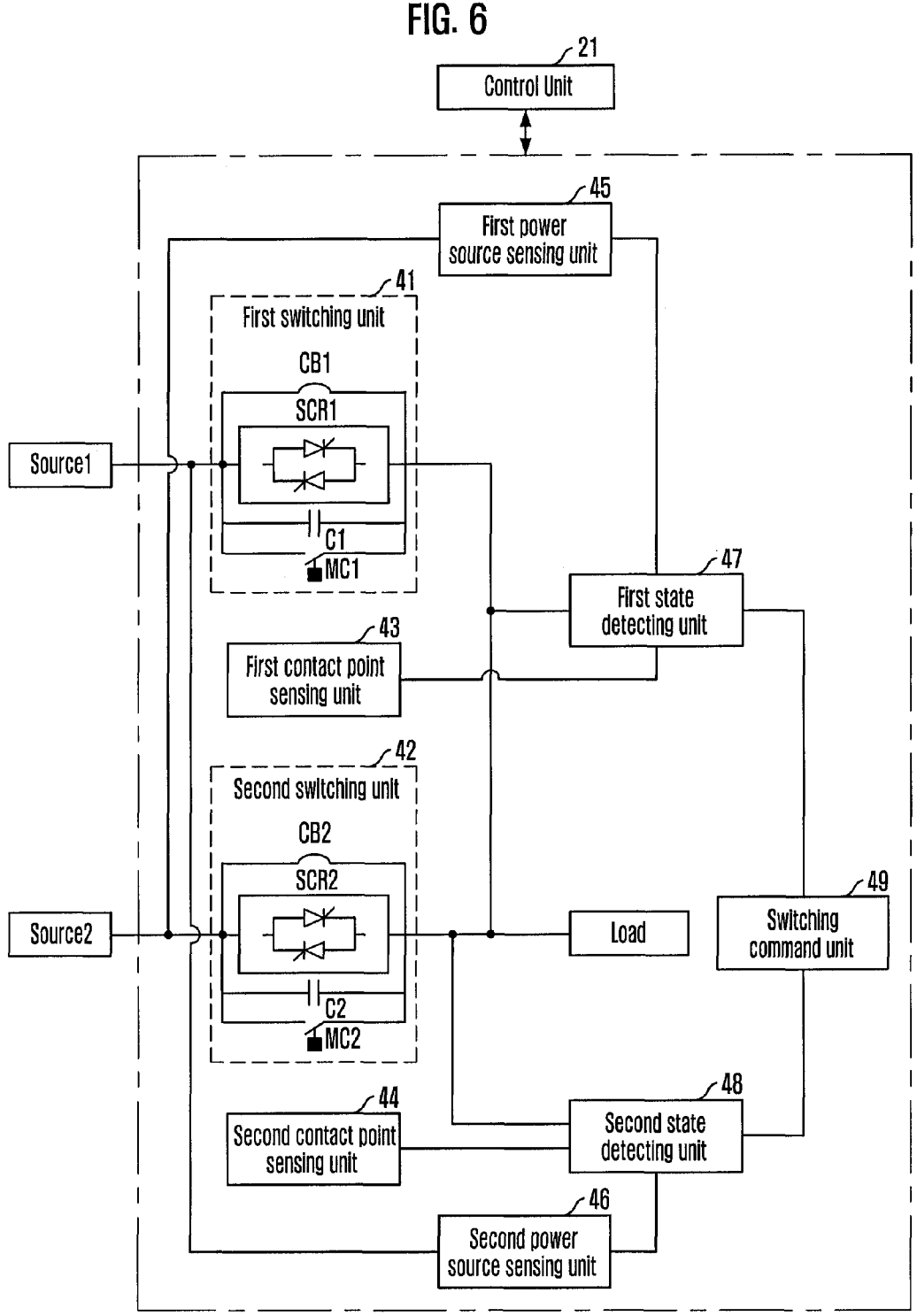
FIG. 6 is a block diagram describing a static transfer switch for static power supply which resolves a problem that may occur in the structure of FIG. 1 and a structure of a power supplying apparatus in accordance with a second embodiment of the present invention.

FIG. 6 is a block diagram describing a static transfer switch for static power supply which resolves a problem that may occur in the structure of FIG. 1 and a structure of a power supplying apparatus in accordance with a second embodiment of the present invention.

Hereafter, the same reference numerals are given to the constituent elements of the same function shown in FIGS. 3 and 4, and description on them will not be provided herein.

Referring to FIG. 6, the power supplying apparatus according to the second embodiment of the present invention includes first and second UPSs (Source1 and Source2), which are power sources, and a static transfer switch. The static transfer switch includes first and second switching units 41 and 42, first and second contact point sensing units 43 and 44, first and second power source sensing units 45 and 46, first and second state detecting units 47 and 48, and a switching command unit 49.

The first switching unit 41 includes the first SCR switch (SCR1) and the first motor driving switch (MC1) connected to each other in parallel, and it supplies output power of the first UPS (Source1) to the load upon receipt of a first driving signal and a first gate signal transmitted from the control unit 21. The first driving signal and the first gate signal will be collectively referred to as first control signals, hereafter. The first switching unit 41 also includes a first capacitor (C1) connected in parallel to the first SCR switch (SCR1) and the first motor driving switch (MC1). The first capacitor (C1) is used for the first contact point sensing unit 43, which will be described later, to figure out whether the first motor driving switch (MC1) is completely turned off.

The second switching unit 42 includes the second SCR switch (SCR2) and the second motor driving switch (MC2) connected to each other in parallel, and it supplies output power of the second UPS (Source2) to the load upon receipt of a second driving signal and a second gate signal transmitted from the control unit 21. The second driving signal and the second gate signal will be collectively referred to as first control signals, hereafter. The second switching unit 42 also includes a second capacitor (C2) connected in parallel to the second SCR switch (SCR2) and the second motor driving switch (MC2). The second capacitor (C2) is used for the second contact point sensing unit 44, which will be described later, to figure out whether the second motor driving switch (MC2) is completely turned off.

The first and second contact point sensing units 43 and 44 sense the mechanical contact point states of the first and second motor driving switches (MC1 and MC2) and transmit contact point sense signals to the first and second state detecting units 47 and 48, respectively, to inform the sense result. In other words, the first and second contact point sensing units 43 and 44 find out whether the corresponding first and second motor driving switches (MC1 and MC2) are completely turned on electrically, and inform the first and second state detecting units 47 and 48 of the result, respectively.

The first and second power source sensing units 45 and 46 sense the output power of the second and first UPSs (Source2 and Source1) and transmit power sense signals to the first and second state detecting units 47 and 48, respectively, to inform the result.

The first and second state detecting units 47 and 48 output state signals to the switching command unit 49 according to the contact point sense signals of the first and second contact point sensing units 43 and 44, the power sense signals of the first and second power source sensing units 45 and 46, and the output voltages of the first and second switching units 41 and 42. In other words, the first and second state detecting units 47 and 48 check the contact point sense signals of the first and second contact point sensing units 43 and 44 and the power sense signals of the first and second power source sensing units 45 and 46 to see whether the first and second switching units 41 and 42 are completely turned off electrically and whether the output voltages of the second and first UPSs (Source2 and Source1) are normal. When the first and second switching units 41 and 42 are completely turned off electrically and the output voltages of the second and first UPSs (Source2 and Source1) are normal, the first and second state detecting units 47 and 48 output to the switching command unit 49 a state signal informing that the first and second switching units 41 and 42 are completely turned off electrically and the output voltages of the second and first UPSs (Source2 and Source1) are normal.

The switching command unit 49 commands to switch a power supply path upon receipt of the state signals transmitted from the first and second state detecting units 47 and 48. In other words, when the power source is switched from the first UPS (Source1) to the second UPS (Source2) and the first switching unit 41 is electrically completely turned off according to the state signal from the first state detecting unit 47 and it is determined that the output voltage of the second UPS (Source2) is normal, the switching command unit 49 transmits a switching command indicating to turn on the second switching unit 42 to the control unit 21 which generate a gate signal and a driving signal. On the contrary, when the power source is switched from the second UPS (Source2) to the first UPS (Source1) and the second switching unit 42 is electrically completely turned off according to the state signal from the second state detecting unit 48 and it is determined that the output voltage of the first UPS (Source1) is normal, the switching command unit 49 transmits a switching command indicating to turn on the first switching unit 41 to the control unit 21.

Figure 7:
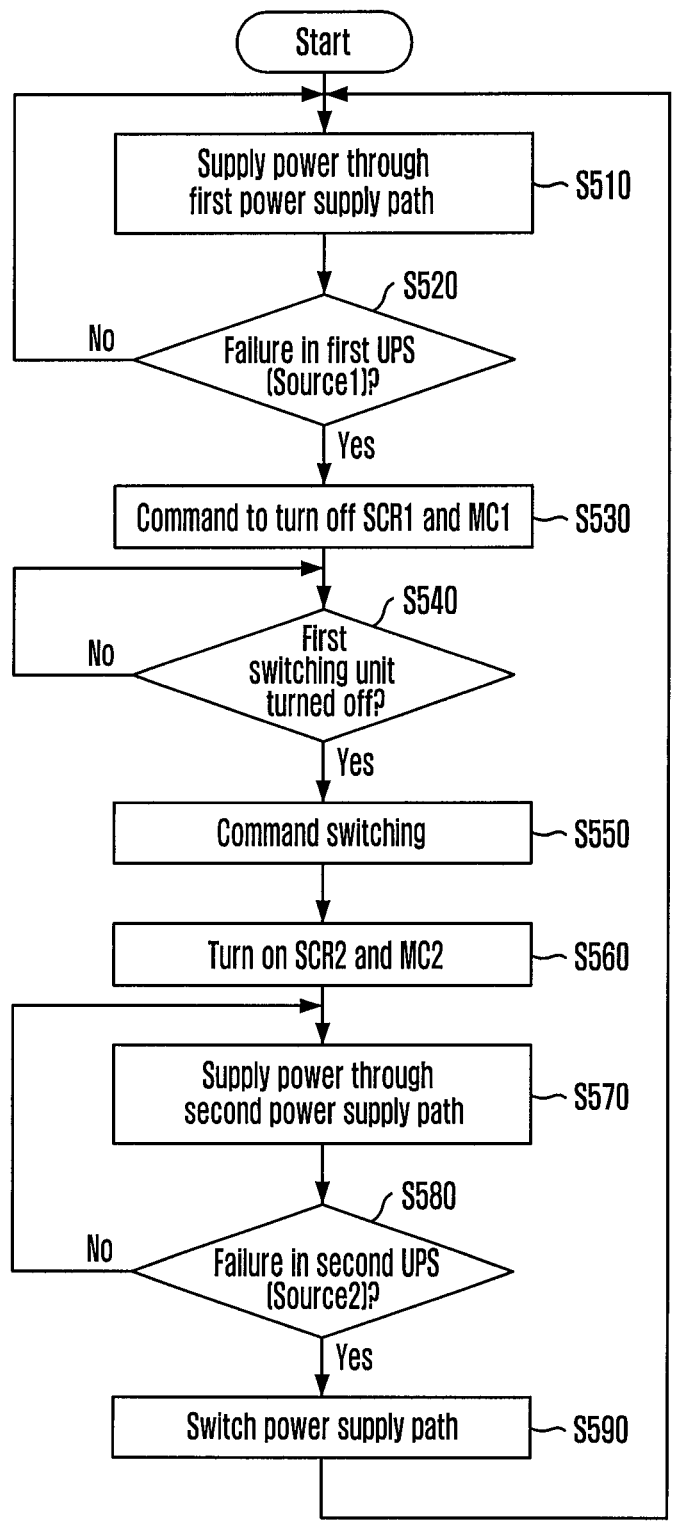
FIG. 7 is a flowchart describing a switching method of the static transfer switch for static power supply having the structure of FIG. 6.

FIG. 7 is a flowchart describing a switching method of the static transfer switch for static power supply having the structure of FIG. 6.

For the convenience in description, a power supply path supplying the output power of the first UPS (Source1) to the load is referred to as a first power supply path, and a power supply path supplying the output power of the second UPS (Source1) to the load is referred to as a second power supply path. Basically, it is assumed that power is supplied to the load through the first power supply path.

At step 5510, when the output power of the first UPS (Source1) is normal and the first control signals, which includes a gate signal and a driving signal, are applied to the first switching unit 41, the first SCR switch (SCR1) and the first motor driving switch (MC1) are sequentially turned on to supply power to the load through the first power supply path.

Herein, the operational relationship between the first SCR switch (SCR1) and the first motor driving switch (MC1) n the first switching unit 41 is as follows. Moreover, the first capacitor (C1) is charged by the output power of the first UPS (Source1).

When a failure occurs in the output power of the first UPS (Source1) during the power supply through the first power supply path at step S520, such as suspension of power supply, the first control signals are applied to the first switching unit 41 first to switch the power supply path from the first power supply path to the second power supply path at step S530.

In other words, the first SCR switch (SCR1) and the first motor driving switch (MC1) are turned off.

Meanwhile, when the second switching unit 42 is turned on at the moment when a command directing to turn off the first switching unit 41 is outputted, there may be a problem that the second SCR switch (SCR2) of the second switching unit 42 is turned on before the first motor driving switch (MC1) is not completely turned off yet while the first SCR switch (SCR1) of the first switching unit 41 is turned off and thus the first power supply path and the second power supply path form a closed circuit. This occurs due to a difference in operation speed between the first SCR switch (SCR1) and the first motor driving switch (MC1). When there is a problem in the output power of the second UPS (Source2) of the second power supply path, there is no use of switching the power supply path.

Therefore, at step S540, the switching command unit 49 checks first whether the first switching unit 41 is electrically completely turned off and whether there is no problem in the output power of the second UPS (Source2) based on the state signals transmitted from the first state detecting unit 47 before the second switching unit 42 is turned on.

For this, the first contact point sensing unit 43 senses whether the first motor driving switch (MC1) is turned off and transmits the result to the first state detecting unit 47, and the first power source sensing unit 45 checks whether there is no problem in the output power of the second UPS (Source2) and transmits the result to the first state detecting unit 47. The first state detecting unit 47 checks whether the first switching unit 41 is completely turned off according to the output voltage of the first switching unit 41 and the output voltage (which can be known from a contact point sense signal) of the first contact point sensing unit 43.

Hereafter, a method of checking whether the first switching unit 41 is turned off or not will be described in detail.

While the first UPS (Source1), which is not a normal power source, continues to output power and the first switching unit 41 is not completely turned off, the output power of the first switching unit 41 comes to have the same value as the first UPS (Source1). Therefore, the first state detecting unit 47 decides that the first switching unit 41 is not turned off when no output power of the first switching unit 41 is detected.

However, although the output power of the first switching unit 41 is '0' voltage, the first switching unit 41 may not be turned off. When the output power of the first UPS (Source1) is '0' voltage, although the first switching unit 41 is turned on, the output power of the first switching unit 41 becomes '0' voltage. In this case, it is not possible to decide whether the first switching unit 41 is turned off or whether the first motor driving switch (MC1) is turned off in the first switching unit 41 only from the output power of the first switching unit 41. Herein, when the voltages at both ends of the first switching unit 41 are '0', the first SCR switch (SCR1) is turned off due to its property. Therefore, only whether the first motor driving switch (MC1) is electrically completely turned off needs to be sensed.

For this, the power supplying apparatus of the present invention includes first and second capacitors (C1 and C2), which are electrical chargers, in parallel to the first and second motor driving switches (MC1 and MC2). In short, when the output power of the first UPS (Source1) is '0' voltage and the first motor driving switch (MC1) is turned on, the power charged in the first capacitor (C1) is discharged and electric current flows through the first motor driving switch (MC1).

In this method, the first contact point sensing unit 43 can sense whether the first motor driving switch (MC1) is actually electrically turned off by the first capacitor (C1) sensing the flow of electric current in the first motor driving switch (MC1) or by sensing a change in the voltage of the first capacitor (C1) by discharge.

When the first state detecting unit 47 receives a contact point sense signal indicating that the first motor driving switch (MC1) is turned off from the first contact point sensing unit 43 and the output power of the first switching unit 41 is '0' voltage, it decides that the first switching unit 41 is completely turned off. The first state detecting unit 47 checks whether the output power of the second UPS (Source2) is normal or not.

When the first switching unit 41 is completely turned off and it is decided that the output power of the second UPS (Source2) is normal, the first state detecting unit 47 outputs a state signal indicating the fact to the switching command unit 49.

When the state signal is received from the first state detecting unit 47, at step S550, the switching command unit 49 transmits a switching command directing to switch the power supply path from the first power supply path to the second power supply path to the control unit 21. The switching command is delivered to a control unit 21 for generating second control signals (which include a gate signal and a driving signal) to turn on the second switching unit 42.

Upon receipt of the switching command, at step S560, the control unit 21 outputs the second control signals to the second switching unit 42 to thereby turn on the second SCR switch (SCR2) and the second motor driving switch (MC2) of the second switching unit 42.

The operational relationship between the second SCR switch (SCR2) and the second motor driving switch (MC2) according to the second control signals is the same as their counterparts in the first switching unit 41.

As described above, as the second switching unit 42 is turned, the output power of the second UPS (Source2) is delivered to the load through the second SCR switch (SCR2) and the second motor driving switch (MC2) at step S570.

When a failure occurs in the output power of the second UPS (Source2), the second contact point sensing unit 44, the second power source sensing unit 46, and the second state detecting unit 48 operate just as the first contact point sensing unit 43, the first power source sensing unit 45, and the first state detecting unit 47 to thereby switch the power supply path back to the first power supply path at step S590.

Since the switch from the second power supply path to the first power supply path is the same as the switch from the first power supply path to the second power supply path, further description will not be provided herein. The above described processes are performed iteratively.

Figure 8:
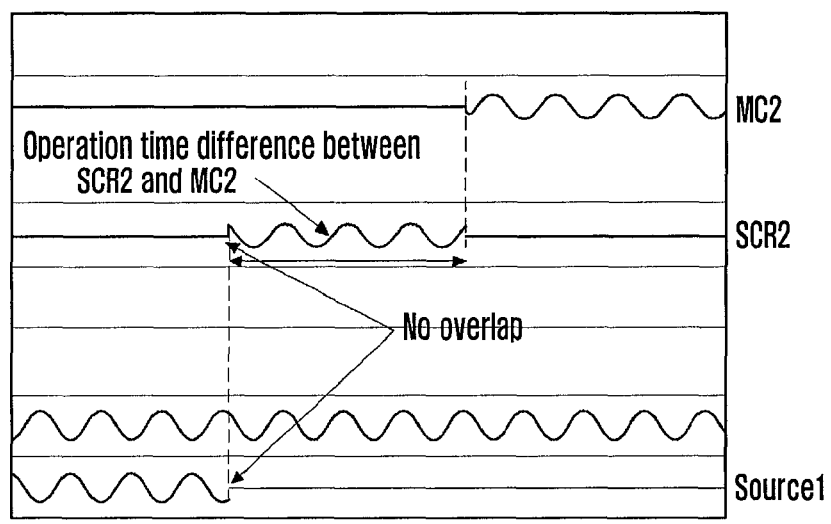
FIGS. 8 and 9 show waveforms of power when a power supply path is switched using the static transfer switch for static power supply having the structure of FIG. 6.
Figure 9:
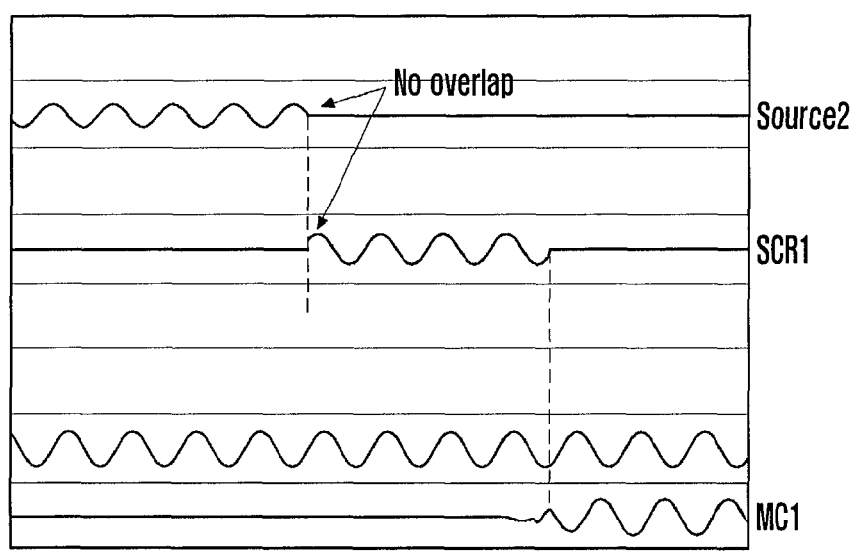

FIGS. 8 and 9 show waveforms of power when a power supply path is switched using the static transfer switch for static power supply having the structure of FIG. 6. FIG. 8 is a waveform when the power supply path is switched from the first power supply path to the second power supply path, and FIG. 9 is a waveform when the power supply path is switched from the second power supply path to the first power supply path.

As described above, when the power supply path is switched, the switching unit to be turned on is turned on after the switching unit to be turned off is electrically completely turned off. In this way, normal power can be supplied to the load without superposition phenomenon, which is shown in FIG. 5.

In the description referring to FIG. 6, the first and second contact point sensing units 43 and 44, first and second power source sensing units 45 and 46, and the first and second state detecting units 47 and 48 were segregated to correspond to the first and second switching units 41 and 42 for the convenience of description. However, it is obvious to those skilled in the art of the present invention that they can be realized as one constituent element.

The embodiment shown in FIG. 6 includes first and second power source sensing units 45 and 46 to check whether the output power of the UPS to be switched to is normal or not, but if the UPS to be switched to outputs stable power, the first and second power source sensing units 45 and 46 are not required.

Also, in the above description, the control unit 21, which is a separate constituent element, generates a gate signal and a driving signal according to a switching command from the switching command unit 49. However, it is also possible to form the switching command unit 49 to directly generate a gate signal and a driving signal and output them to a corresponding switching unit.

The method of the present invention described above may be programmed for a computer. Codes and code segments constituting the computer program may be easily inferred by a computer programmer of ordinary skill in the art to which the present invention pertains. The computer program may be stored in a computer-readable recording medium, i.e., data storage, and it may be read and executed by a computer to realize the method of the present invention. The recording medium includes all types of computer-readable recording media.

While the present invention has been described with respect to certain preferred embodiments, it will be apparent to those skilled in the art that various changes and modifications may be made without departing from the scope of the invention as defined in the following claims.

What is claimed is:

1. A static transfer switch, comprising:
   a first contact switch configured to be turned on or off according to a first driving signal to supply output power of a first power source to a load;
   a first semiconductor switch configured to be connected in parallel to the first contact switch, and configured to be turned on or off according to a first gate signal to supply the output power of the first power source to the load when the first contact switch is turned off;
   a second contact switch configured to be turned on or off according to a second driving signal to supply output power of a second power source to the load;
   a second semiconductor switch configured to be connected in parallel to the second contact switch, and configured to be turned on or off according to a second gate signal to supply the output power of the second power source to the load when the second contact switch is turned off;
   a control unit configured to generate the first and second driving signals and the first and second gate signals;
   a contact point sensing unit configured to sense whether each contact switch is electrically turned off and to output a contact point sense signal;
   a state detecting unit configured to sense whether each switch is turned off according to output power of the each switch and the contact point sense signal transmitted from the contact point sensing unit, and to output a state signal; and
   a switching command unit configured to command to switch a power supply path to the load according to the state signal outputted from the state detecting unit,
   wherein the control unit simultaneously generates the first driving signal and the first gate signal together, and simultaneously transmits the first driving signal and the first gate signal together to the first contact switch and the first semiconductor switch, and
   wherein the control unit simultaneously generates the second driving signal and the second gate signal together, and simultaneously transmits the second driving signal and the second gate signal together to the second contact switch and the second semiconductor switch.

2. The static transfer switch of claim 1, wherein the first semiconductor switch continues to receive the first gate signal even when the first contact switch is turned on, and
   the second semiconductor switch continues to receive the second gate signal even when the second contact switch is turned on.

3. The static transfer switch of claim 1, wherein the first contact switch has an impedance lesser than an internal impedance of the first semiconductor switch, and
   the second contact switch has an impedance lesser than an internal impedance of the second semiconductor switch,
   wherein the impedances are contact resistances.

4. The static transfer switch of claim 3, wherein a turn-on lead time of the first contact switch is longer than a turn-on lead time of the first semiconductor switch, and
   a turn-on lead time of the second contact switch is longer than the second semiconductor switch.

5. The static transfer switch of claim 3, wherein the first and second contact switches are mechanical contact point switches that are turned on or off mechanically.

6. The static transfer switch of claim 3, wherein the first and second contact switches are electrical contact point switches that are turned on or off electrically.

7. The static transfer switch of claim 3, wherein the first and second semiconductor switches are semiconductor switches of a kind selected from a group consisting of a silicon controlled rectifier (SCR) switch, an insulated gate bipolar transistor (IGBT) switch, a gate turn-off (GTO) switch, and a bipolar junction transistor (BJT).

8. The static transfer switch of claim 1, further comprising:
   a power source sensing unit configured to sense output power of the plurality of power sources to thereby produce a power sense signal and to transmit the power sense signal to the state detecting unit,
   wherein the state detecting unit senses whether the each switch is turned off based on the output power of the each switch, the contact point sense signal transmitted from the contact point sensing unit, and the power sense signal transmitted from the power source sensing unit, checks whether output power of a power source to be switched to among the plurality of power sources is normal, and outputs a state signal.

9. The static transfer switch of claim 1, further comprising:
   a charger configured to be connected in parallel to each contact switch and to charge output power of power source corresponding to turn-on and turn-off of the switches based on the driving signals and the gate signals.

10. The static transfer switch of claim 9, wherein the contact point sensing unit senses a voltage variation of the charger caused by discharge of the charger and senses whether the contact switches are turned off.

11. The static transfer switch of claim 9, wherein the contact switch senses an electric current flowing through the contact switches by the discharge of the charger and senses whether the contact switches are turned off.

12. A power supplying apparatus, comprising:
a first power source;
a second power source;
a first contact switch configured to be turned on or off according to a first driving signal to supply output power of the first power source to a load;
a first semiconductor switch configured to be connected in parallel to the first contact switch, and configured to be turned on or off according to a first gate signal to supply the output power of the first power source to the load when the first contact switch is turned off;
a second contact switch configured to be turned on or off according to a second driving signal to supply output power of the second power source to the load;
a second semiconductor switch configured to be connected in parallel to the second contact switch, and configured to be turned on or off according to a second gate signal to supply the output power of the second power source to the load when the second contact switch is turned off;
a control unit configured to generate the first and second driving signals and the first and second gate signals;
a contact point sensing unit configured to sense whether each contact switch is electrically turned off and to output a contact point sense signal;
a state detecting unit configured to sense whether each switch is turned off according to output power of the each switch and the contact point sense signal transmitted from the contact point sensing unit, and to output a state signal; and
a switching command unit configured to command to switch a power supply path to the load according to the state signal outputted from the state detecting unit,
wherein the control unit simultaneously generates the first driving signal and the first gate signal together, and simultaneously transmits the first driving signal and the first gate signal together to the first contact switch and the first semiconductor switch, and
wherein the control unit simultaneously generates the second driving signal and the second gate signal together, and simultaneously transmits the second driving signal and the second gate signal together to the second contact switch and the second semiconductor switch.

13. The power supplying apparatus of claim 12, wherein the first power source is a first uninterruptible power supplier (UPS) and the second power source is a second UPS.

14. The power supplying apparatus of claim 12, wherein the first semiconductor switch continues to receive the first gate signal even when the first contact switch is turned on, and the second semiconductor switch continues to receive the second gate signal even when the second contact switch is turned on.

15. The power supplying apparatus of claim 14, wherein the first contact switch has an impedance lesser than an internal impedance of the first semiconductor switch, and
the second contact switch has an impedance lesser than an internal impedance of the second semiconductor switch,
wherein the impedances are contact resistances.

16. The power supplying apparatus of claim 14, wherein a turn-on lead time of the first contact switch is longer than a turn-on lead time of the first semiconductor switch, and
a turn-on lead time of the second contact switch is longer than a turn-on lead time of the second semiconductor switch.

17. The power supplying apparatus of claim 12, wherein the power sources are uninterruptible power suppliers (UPS).

18. The power supplying apparatus of claim 12, further comprising:
a power source sensing unit configured to sense output power of the plurality of power sources to thereby produce a power sense signal and to transmit the power sense signal to the state detecting unit,
wherein the state detecting unit senses whether each switch is turned off based on the output power of the each switch, the contact point sense signal transmitted from the contact point sensing unit, and the power sense signal transmitted from the power source sensing unit, checks whether output power of a power source to be switched to among the plurality of power sources is normal, and outputs a state signal.

19. The power supplying apparatus of claim 12, further comprising:
a charger configured to be connected in parallel to each contact switch and to charge output power of power source corresponding to turn-on and turn-off of the switches based on the driving signals and the gate signals.

20. The power supplying apparatus of claim 19, wherein the contact point sensing unit senses a voltage variation of the charger caused by discharge of the charger and senses whether the contact switches are turned off.

21. The power supplying apparatus of claim 19, wherein the contact switch senses an electric current flowing through the contact switches by the discharge of the charger and senses whether the contact switches are turned off.

* * * * *